Patented June 24, 1941

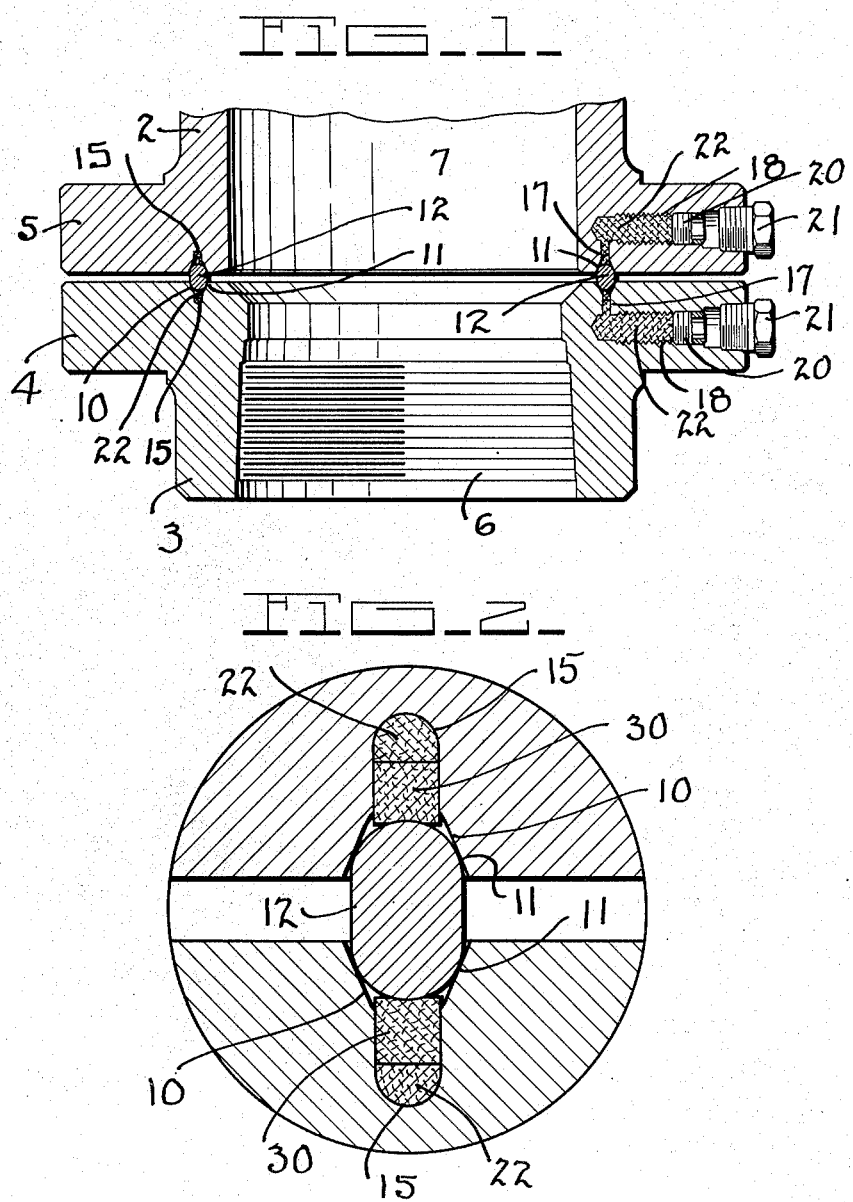

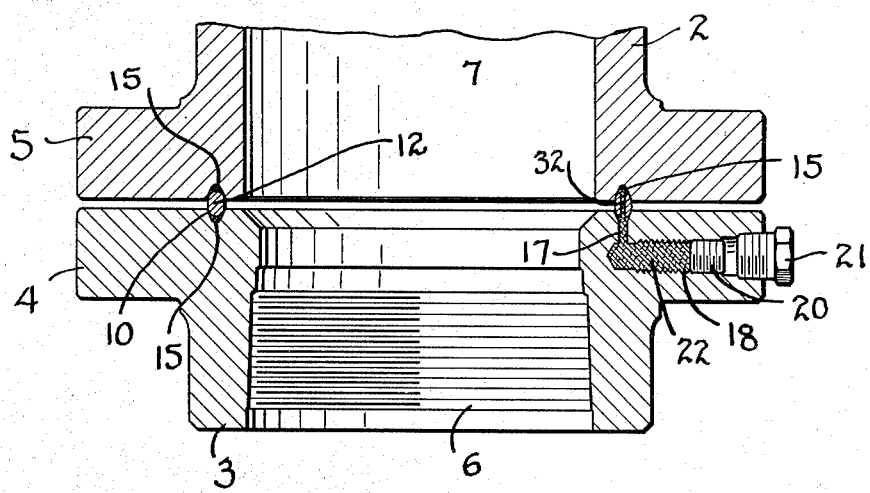
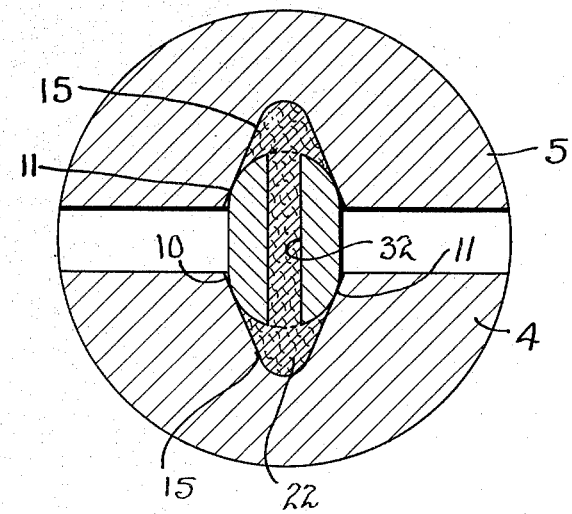

2,246,600

UNITED STATES PATENT OFFICE 2,246,600

PRESSURE SEAL FOR FLANGE CONNECTION

Paul T. Putnam and Madden T. Works, Houston, Tex., assignors to Cameron Iron Works, a corporation Application August 21, 1939, Serial No. 291,144

3 Claims. (Cl. 285—109)

The invention relates to a pressure seal for flanged connections or abutting members where a seal is to be maintained against an internal pressure.

In connections of the type to which the invention relates it is not uncommon that the equipment has to be changed, stored and handled and the contacting surfaces which are to form the seal may become damaged or marred in such a way that a perfect seal can not be maintained when the parts are assembled. This is particularly true in connection with heavy valves and fittings which are used in the oil industry where these fittings have to be handled continuously in being moved from one location to another.

It is one of the objects of the invention to provide a connection for pipes wherein a seal ring is maintained under pressure of a lubricant or plastic packing to insure a perfect seal.

Another object of the invention is to provide a lubricant or plastic packing under pressure behind a seal ring in flanged connections.

Still another object of the invention is to provide a packing to engage a seal ring wherein the packing is held in position by a lubricant or plastic packing under pressure.

Still another object of the invention is to provide a seal ring wherein a lubricant may be applied to the ring and flow through the ring so as to equalize the pressure on the opposed sealing surfaces.

Other and further objects of the invention will be readily apparent when the following description is considered in connection with the accompanying drawings wherein:

Fig. 1 is a broken sectional view of a flanged connection to which the invention has been applied.

Fig. 2 shows a slightly different form of the invention where a strip packing is provided to abut against the seal ring.

Fig. 3 shows a form of the invention wherein the material under pressure is applied at one side of the ring and permitted to flow through the ring so as to equalize the pressure on both sides.

Fig. 4 is an enlarged sectional view of the ring illustrating the manner in which the liquid under pressure is applied to the ring.

In Fig. 1 a pair of pipe couplings or other pieces of equipment have been illustrated at 2 and 3. Each of these parts has a flange thereon and in Fig. 1 these flanges are identical. The lower flange 4 is arranged to be placed in alignment with the flange 5 so that the passages 6 and 7 respectively are also in alignment.

Each of the flanges has an annular groove 10 which may be of any desired shape or configuration. Such groove provides a pair of opposed inclined seating faces 11 which are arranged to receive the seal ring 12. When the ring is seated as seen in Fig. 1 there will be four contact surfaces, such as 11, two in the flange 4 and two in the flange 5.

In constructions of this sort the surfaces 11 may become scarred or marred in some manner due to handling of equipment. The same is true of the ring 12 because the seating surfaces thereon may not be exactly accurate to engage the sealing faces 11 so that when the flanges are assembled and clamped together with suitable bolts and other fastening devices there may not be a perfect seal entirely around the openings 6 and 7.

The present invention is therefore applied to this construction by deepening the grooves 10 so as to form a recess 15 in the base of each of the grooves. This recess has been illustrated as of less width than the grooved area so that the ring 12 may not move down into the recessed portion.

This recess extends entirely around the flange 4 and one, the righthand side of Fig. 1, is shown as having a passage 17 leading into the recess. This passage is in turn connected with an opening 18 in the flange which is in the nature of a storage chamber. A check valve 20 may be screwed into the outer end of the chamber 18, if desired, and a plug 21 is used to close the opening in the flange beyond the check valve.

In order to assist in forming a seal between the ring 12 and the seats 11 the plug 20 may be removed and any desired type of stick or plastic packing or lubricant 22 may be injected into the chamber 18 under pressure by passing it through the check valve 20. This lubricant or plastic packing will flow into the chamber 18 through the passage 17 and around the recess 15. In this manner any desired pressure may be applied behind the seal ring 12. In event there are any inaccuracies or imperfections in either the ring or the seat this packing or lubricant will flow into these areas and tend to form a seal.

A perfect seal may be maintained by subjecting the lubricant or packing in the chamber 18 and recess 15 to at least the pressure which is present in the passages 6 and 7. If this is done it is obvious that there can be no leakage around the ring because the pressures will be balanced.

The chamber 18 serves as a storage chamber and in event there is a reduction in pressure in the passages 6 and 7 the lubricant may flow forwardly to compensate for leakage. The construction just described is duplicated in the flange 5 in the Fig. 1 form of the invention so that the same or a greater or less pressure may be applied on both sides of the ring 12 and in both of the recesses 15.

In Fig. 2 a slightly different form of the invention has been shown which is the same as that just described except that a strip of packing 30 has been positioned in the recess 15, which is slightly deeper than the recess of Fig. 1. The lubricant 22 is forced in behind this packing strip 30 so as to urge the strip against the base of the ring 12. In this manner a seal is maintained by the strip 30 but in event there is an imperfection of substantial size the lubricant 22 can not escape due to the provision of the strip packing 30.

Fig. 3 shows a form of the invention which is the same as described in connection with Fig. 1 except that a particular type of seal ring 12 has been provided. This ring is seen in enlarged section in Fig. 4 and may have a plurality of holes 32 drilled or otherwise formed axially of the ring. These holes are for the purpose of connecting the recesses 15 on opposite sides of the ring so that only one fitting for applying packing or lubricant is required. In this manner only one flange, as seen in Fig. 3, need be formed with the chamber and fittings to apply the lubricant and the lubricant is permitted to flow into the opposite flange and to also equalize the pressure on the opposite sides of the seal ring.

Broadly the invention contemplates a pressure packing for seal rings wherein a liquid under pressure is used to maintain a seal with the ring.

What is claimed is:

1. A seal ring connection for pipe flanges including a recessed area in each flange, a metal seal ring to fit said recesses, and means to force sealing fluid into the recesses behind said ring at a pressure in excess of the pipe pressure.

2. A seal ring connection for pipe flanges including a recessed area in each flange, a metal seal ring to fit said recesses, and means to force sealing fluid into the recesses behind said ring at a pressure in excess of the pipe pressure and including a storage chamber in each flange.

3. In a seal ring connection for abutting members, a recess in each member, a seal ring to seat in said recesses of a configuration to leave a channel in the base of the recess behind the ring, a strip packing in said channel abutting said ring, and means to force plastic packing or lubricant into the channel to seal said ring.

PAUL T. PUTNAM.
MADDEN T. WORKS.